(12) United States Patent
Liu et al.

(10) Patent No.: US 9,117,471 B1
(45) Date of Patent: Aug. 25, 2015

(54) AC MR-OFFSET COMPENSATION (71) Applicant: Seagate Technology LLC, Cupertino, CA (US)

(72) Inventors: Xiong Liu, Singapore (SG); Mingzhong Ding, Singapore (SG); KianKeong Ooi, Singapore (SG); Hoang Dung Vu, Singapore (SG); Chan Fan Lau, Singapore (SG); Xiang Lu, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/577,400

(22) Filed: Dec. 19, 2014

(51) Int. Cl.
G11B 5/02 (2006.01)
G11B 5/56 (2006.01)

(52) U.S. Cl.
CPC .................................. G11B 5/56 (2013.01)

(58) Field of Classification Search
None
See application file for complete search history.

(56) References Cited

U.S. PATENT DOCUMENTS

| 3,812,533 | A  | * | 5/1974  | Kimura et al. | ............. 360/77.08 |
| 6,317,285 | B1 |   | 11/2001 | Bi et al.     |                         |
| 6,498,693 | B1 |   | 12/2002 | Au et al.     |                         |
| 6,956,711 | B2 |   | 10/2005 | Hanson et al. |                         |
| 6,972,540 | B1 | * | 12/2005 | Wang et al.   | ............. 318/400.34 |
| 7,068,451 | B1 | * | 6/2006  | Wang et al.   | ..................... 360/51 |
| 7,215,496 | B1 | * | 5/2007  | Kupferman et al. | ........... 360/51 |
| 7,551,390 | B1 |   | 6/2009  | Wang et al.   |                         |
| 7,990,089 | B1 | * | 8/2011  | Ying et al.   | ............. 318/400.13 |
| 8,749,909 | B1 | * | 6/2014  | Herbst et al. | ..................... 360/51 |
| 2002/0012191 | A1 | * | 1/2002 | Ho et al.    | .................... 360/77.04 |
| 2002/0039248 | A1 |   | 4/2002 | Liu et al.   |                         |
| 2002/0067567 | A1 | * | 6/2002 | Szita        | .......................... 360/77.04 |
| 2003/0007276 | A1 | * | 1/2003 | Satoh        | ............................. 360/63 |

* cited by examiner

*Primary Examiner* — Peter Vincent Agustin
(74) *Attorney, Agent, or Firm* — Hollingsworth Davis, LLC (57) ABSTRACT An apparatus includes a controller configured to be coupled to a read/write head. The controller is configured to perform various operations including detecting a change in a time interval difference between servo sectors of a servo marked recording medium, converting the change to an offset signal that compensates for the change, and positioning the read/write head relative to the servo mark recording medium in response to the offset signal. The change in the time interval difference is representative of disk slip.

19 Claims, 6 Drawing Sheets

AC MR-OFFSET COMPENSATION

SUMMARY

An apparatus of the present disclosure includes a controller configured to be coupled to a read/write head. The controller is additionally configured to perform various operations including detecting a change in a time interval difference between servo sectors of a servo marked recording medium, converting the change to an offset signal that compensates for the change, and positioning the read/write head relative to the servo marked recording medium in response to the offset signal. The change in the time interval difference is representative of disk slip.

A method of the present disclosure includes detecting a change in a time interval difference between servo sectors of a servo marked recording medium, converting the change to an offset signal that compensates for the change, and positioning the read/write head relative to the servo marked recording medium in response to the offset signal. The change in the time interval difference is representative of disk slip.

A system of the present disclosure includes a servo marked recording medium having a plurality of servo sectors and a pre-determined time interval difference between the servo sectors and a controller configured to be coupled to a read/write head. The controller is additionally configured to perform various operations including detecting a non-operational shock induced change in time interval difference from the pre-determined time interval difference between servo sectors of the servo marked recording medium, converting the change to an offset signal that compensates for the change, and positioning the read/write head relative to the servo marked recording medium in response to the offset signal. The change in the time interval difference is representative of disk slip.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the manufacturing process of hard disk drives (HDDs), servo tracks along with encoded servo bursts are often written onto a disk using a servo track writer (STW). The STW may comprise a multi-disk writer (MDW) having a plurality of dedicated servo heads for higher efficiency of production. One or more of the servo written disks are then installed into the HDD where the servo patterns will be used to position a head over a particular track. Ways to increase the data storage capacity of a disk are continually being explored. One way to increase storage capacity is by increasing the number of tracks per unit width or tracks per inch (TPI).

An increase in TPI increases the need for consistent and accurate servo patterns upon which the disk drive head can rely for accurate positioning. In general, the servo patterns that define the tracks and sectors of a disk are placed in a substantially concentric fashion as any disturbance or eccentricity present during the servo writing process will appear as a written-in repeatable runout (RRO) error for which compensation should be provided. Further the servo sectors of any track should be substantially aligned with the servo sectors of adjacent tracks; any misalignment results in non-equidistant position error signal (PES) sampling intervals.

Various procedures have been developed to compensate for inaccuracies such as RRO, PES and others. For example, a certification process may be performed on the disk drive that includes various tests and calibrations. The tests and calibrations may comprise, for example, a virtual concentric aligned tracks (VCAT) test that compensate for track eccentricity and a time mark feed forward (TMFF) calibration to compensate for timing mark modulation.

However, an HDD is always subject to experiencing a shock, such as an operational or non-operational shock (NOS). Any type of shock can result in disk slip subjecting the HDD to newly introduced head positioning inaccuracies which are no longer able to be addressed by the previously performed tests and calibrations. The present disclosure is directed to a system and method for compensating disk slip occurring in a disk drive as a consequence of the disk drive experiencing a shock; the system and method may be performed in the field.

Figure 1:
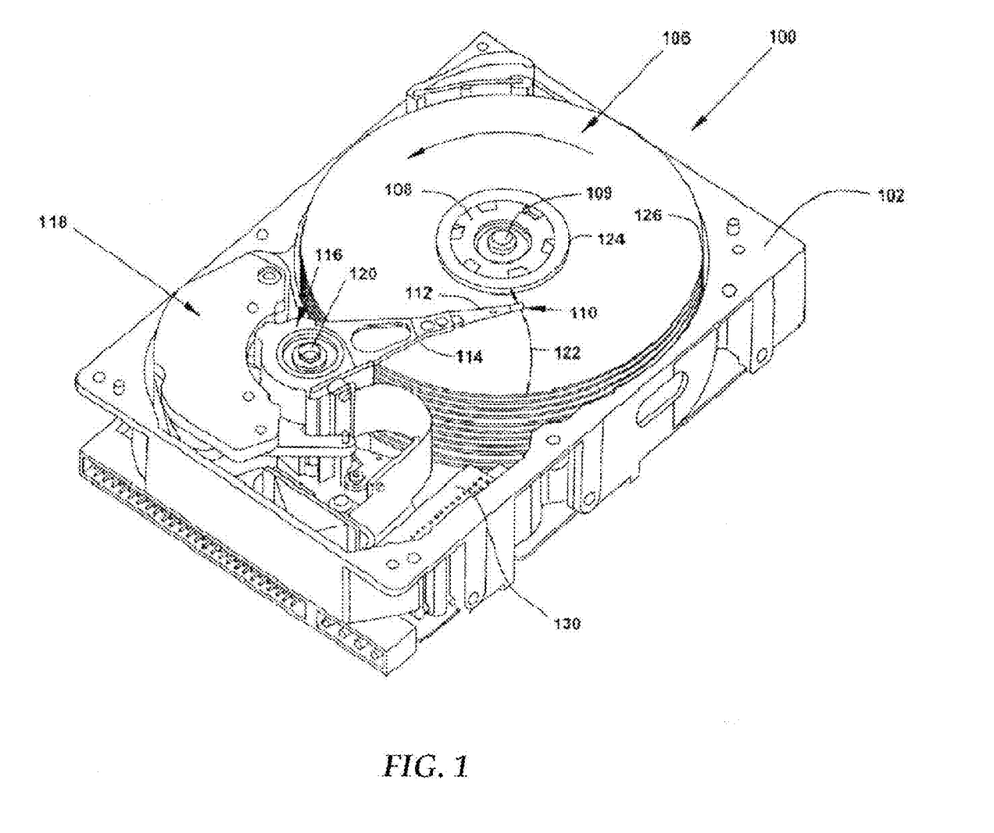
FIG. 1 is a perspective view of a hard disk drive.

Referring now to FIG. 1, a perspective view of an HDD 100 in which embodiments of the present invention are useful is shown. HDD 100 includes a housing with a base 102 and a top cover (not shown). HDD 100 further includes a disk pack 106, which is mounted on a spindle motor (not shown) by a disk clamp 108. Disk pack 106 includes a plurality of individual disks, which are mounted for co-rotation about central axis 109. Each disk surface has an associated disk head slider 110 which is mounted to HDD 100 for communication with the disk surface. In the example shown in FIG. 1, sliders 110 are supported by suspensions 112 which are in turn attached to track accessing arms 114 of an actuator 116.

The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disk inner diameter 124 and a disk outer diameter 126. Voice coil motor 118 is driven by servo electronics 130 based on signals generated by heads 110 and a controller (not shown).

Figure 2:
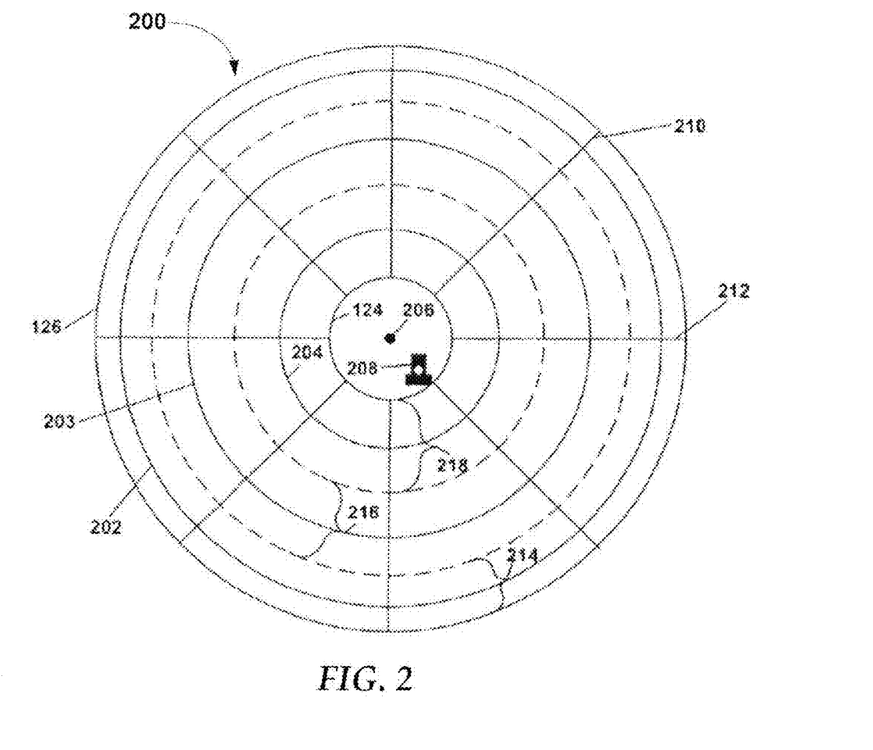
FIG. 2 is a top view of a servo marked disk.

Referring now to FIG. 2, a simplified top view of a section of a disk 200 is shown with pre-written servo-tracks such as 202, 203 and 204. The disk 200 is mounted on a disk drive spindle motor having a spin-axis 208. Disk 200 includes a plurality of radially extending servo fields such as servo fields 210 and 212 which define a plurality of servo sectors. It should be noted that while FIG. 2 illustrates straight radially extending lines, the radially extending lines may be of another configuration, for example, they may be curved to accommodate a rotational actuator. Disk 200 may also be divided into zones, with each zone including multiple tracks. In FIG. 2, three zones 214, 216 and 218 are shown. Pre-written servo tracks 202, 203 and 204 have an actual track center shown by reference numeral 206.

When a disk drive, such as HDD 100, is subjected to a shock, disk slip may occur resulting in AC MR-offset modulation due the fact that both the reader and writer of the disk drive head 110 are no longer following a concentric circle on the disk; the situation will likely be at its worst at the inner diameter of the disk. The once-per-round AC modulation may cause adjacent track erasure from new write operations. As such, data integrity or uncorrectable data error (UDE) may establish a potential failure mode after the occurrence of a shock. The AC MR-offset modulation may be particularly problematic for HDDs having increased track density, for example, shingled magnetic recording (SMR) HDDs.

As noted earlier, after manufacturing calibration (VCAT process), all data tracks on a disk are concentrically aligned. As such, during data writing, the reader reads the servo position signal for closed loop position control to follow a servo track while the writer position is always at a fixed DC distance apart from reader. This DC distance is the so-called reader writer offset or MR-offset. The MR-offset varies from outer diameter (OD) to inner diameter (ID). MR-offset is also calibrated during manufacturing process. However, when a disk slip occurs after a non-operation shock, there is a physical drift between the data track center relative to the motor rotation center, e.g., the data tracks are no longer concentrically aligned. When the reader follows a servo track, there will be a once-per-round AC motion. Similarly, the writer will have an AC motion. Because of this, the reader-writer offset will no longer be a pure DC gap. Instead, there will be an AC component on top of the DC component. This extra AC component of reader-writer offset will cause a newly written track to encroach upon older, nearby data tracks.

Figure 3A:
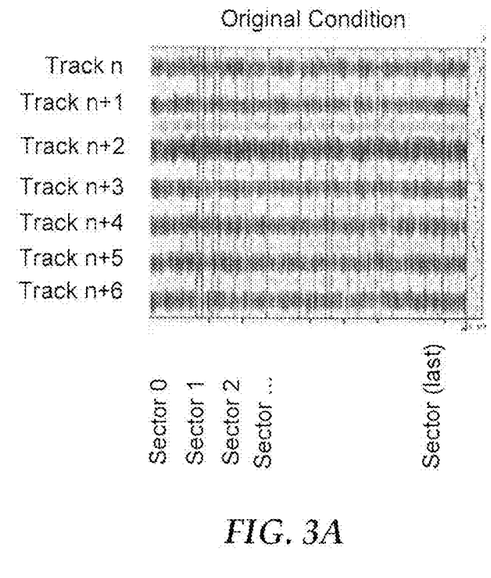
FIGS. 3A-3B comprise magnetic-readback-mapping (MRM) plots contrasting written data without and with disk slip, respectively.
Figure 3B:
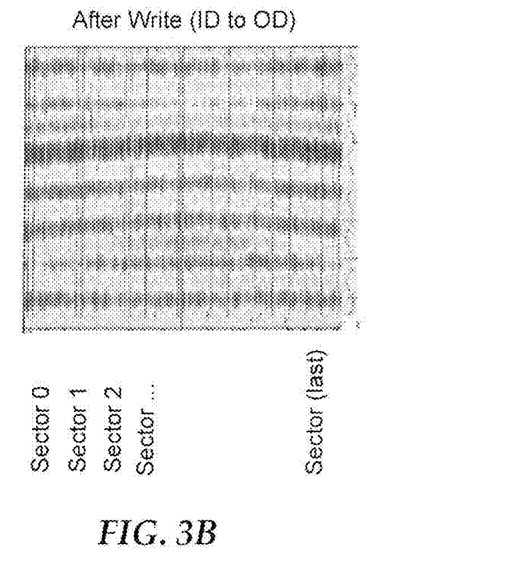

Further, the drift between the motor center of the drive and the track center of the disk will cause additional timing mark modulation, i.e., a timing interval change from servo wedge to servo wedge. FIGS. 3A and 3B provide magnetic-read-back-mapping (MRM) plots that contrast six tracks of written data prior to a shock, FIG. 3A, and after a shock-inducing occurrence of disk slip, FIG. 3B. Notably, adjacent tracks (track n+5 and track n+1) suffered a great amount of erasure rather than newly written tracks n+2, n+3, and n+4.

Figure 4:
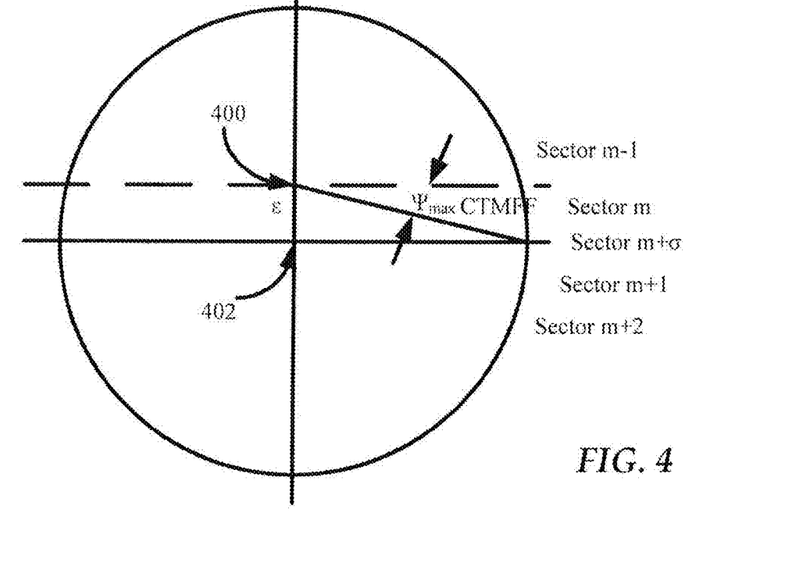
FIG. 4 is a diagram illustrating disk slip.

In accordance with the present disclosure and with reference to FIG. 4, a system and method is provided to recalibrate the TMFF and, based on the recalibrated TMFF, compensate the AC MR-offset caused by the disk slip; the TMFF recalibration and AC MR-offset compensation is performed in the field. FIG. 4 illustrates a situation where motor center 400 and track center 402 misalignment have occurred after disk slip creating timing mark modulation and AC MR-offset modulation. The change of the time interval between the servo wedges follows the first harmonic of motor speed as does the cumulative TMFF (CTMFF). The magnitude of CTMFF is proportional to disk slip (ε), see FIG. 4, and can be calculated according to equation one below:

$$\Psi_{max} = \tan^{-1}\left(\frac{\varepsilon}{r}\right) \quad \text{Eq. (1)}$$

Based on disk drive geometry, there is a relationship between the down-track timing interval modulation and cross-track AC MR-offset modulation, which will be described further below.

To achieve AC MR-offset compensation two steps may be performed. The first step provides for pre-calculating the relationship between the timing interval modulation and AC MR-offset modulation based on actual drive and MR-offset calibration results during disk drive certification performed by the manufacturer. The second step is to be executed in the field after a shock to the disk drive has produced disk slip. In this second step, the TMFF is recalibrated and a new AC MR-offset compensation feed forward amount is calculated and applied. The detail for each step is provided below:

I. Pre-Calculation During Certification Test:
   Pre-calculate max CTMFF with 1 mil disc $$\psi_{1mil} = \tan^{-1}(0.02541/r)$$

Pre-determine target tracks and their radius r to be used for polynomial fitting of AC MR-offset w.r.t track number.

Pre-calculate $\eta_{1mil}$–max AC MR-offset for the target tracks using the following equation:

$$\eta_{1mil} = \varepsilon \times \frac{\delta \cdot OP}{PR\sqrt{PW^2 - r^2 + PR^2}} \quad \text{Eq. (2)}$$

δ, OP, PR, PW, r are the HDD physical dimensions

Pre-calculate $\lambda_{1mil}$–phase difference between AC MR-offset and disc slip phase using the following equation:

$$\lambda_{1mil} = 90° - \beta \quad \text{Eq. (3)}$$

where $$\beta = \text{acos}\left(\frac{r^2 + OP^2 - PR^2}{2 \cdot r \cdot OP}\right)$$

Figure 5:
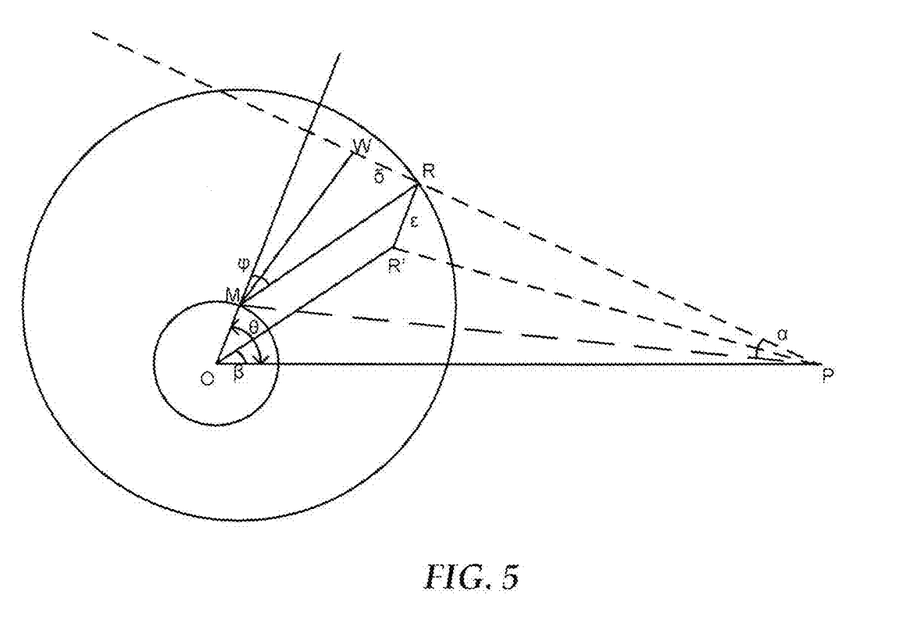
FIG. 5 is a diagram illustrating disk slip and other physical dimensions of a disk drive.

The formula derivation of reader-writer offset modulation due to disk slip is provided below with reference to FIG. 5, which illustrates disk slip and other dimensions of an HDD.

Given O, M, P, R, W are the motor center, disc center, pivot, reader and writer respectively.

MR=r is the radius of the track which is defined by track number.

ε is the amount (amplitude) of disc slip which is estimated using TMFF.

φ is the phase of disc slip with respect to sector 0.

δ Reader-Writer gap.

PR, PO are the physical dimensions of drive (Pivot to Reader, Pivot to Motor center).

Find MW is the distance from disc center to writer.

Solution:

Adding a point R' such that RR'=MO=ε and MR=OR'=r

→β can be calculated as $$\cos(\beta) = \frac{r^2 + OP^2 - PR'^2}{2 \cdot r \cdot OP}$$

As $\epsilon \ll PR$, OR, OP, in $\Delta PR'O$ we make an assumption $$PR' \approx PR$$

→β hence becomes $$\beta = \text{acos}\left(\frac{r^2 + OP^2 - PR^2}{2 \cdot r \cdot OP}\right)$$

Angle θ is then $$\theta = \beta + \phi$$

PM is then calculated as $$PM = \sqrt{\epsilon^2 + OP^2 - 2\cos(\theta) \cdot \epsilon \cdot OP}$$

From $\Delta MPR$, the angle $\alpha = \widehat{RPM}$ becomes $$\cos(\alpha) = \frac{PM^2 + PR^2 - r^2}{2 \cdot PR \cdot PM}$$

From $\Delta MPW$, the MW is calculated as $$MW^2 = PW^2 + PM^2 - 2\cos(\alpha)PM \cdot PW$$

$$= PW^2 + r^2 - PR^2 - \frac{\delta}{PR} \times (PM^2 + PR^2 - r^2)$$

The R/W offset caused by disc slip $\epsilon$ is calculated as $$MR - MW = r - \sqrt{PW^2 + r^2 - PR^2 - \frac{\delta}{PR} \times (PM^2 + PR^2 - r^2)}$$

Notice that only PM depends on θ (or only on cos(θ)) meaning that all other parameters can be easily pre-calculated. The amplitude and phase of the 1× sine wave can also be easily estimated. Let $$a = PW^2 + r^2 - PR^2,$$

$$b = \frac{2 \cdot \delta \cdot \varepsilon \cdot OP}{PR}$$

The amplitude of the 1× modulation can be estimated as $$\eta \approx \frac{\sqrt{a+b} - \sqrt{a-b}}{2} \approx \frac{b}{2\sqrt{a}} \text{ (as } b \gg a\text{)}$$

This gives Equation (2) above.
The phase difference with φ can also be computed as $$\lambda = 90° - \beta$$

This gives Equation (3) above.
Having performed the first step for pre-calculating the relationship between the timing interval modulation and AC MR-offset modulation based on actual drive and MR-offset calibration results during disk drive certification, upon the occurrence of a shock and resulting disk slip, the second step to determine and apply a new AC MR-offset feed forward amount may be performed in the field as described below.

Figure 6:
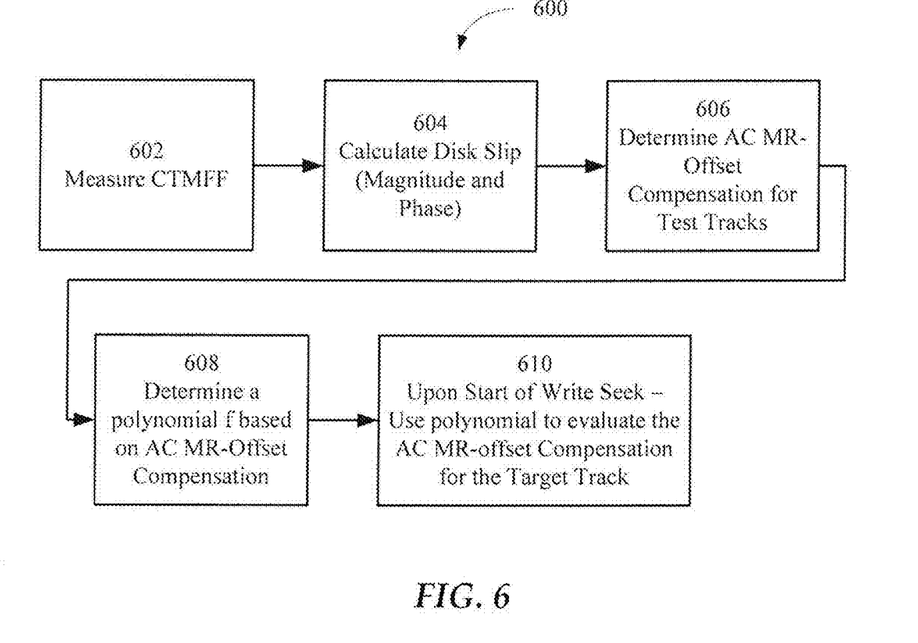
FIG. 6 is a flowchart illustrating compensation of AC MR-offset in the field.

II. Compensate Read/Write Offset in Field:

FIG. 6 is a flowchart illustrating the procedure 600 for determining the compensation for AC MR-offset while in the field. Upon the system controller detecting an AC component in the VCM actuator control, which will be present in order for the reader to follow a non-concentric data track, the system controller may initiate the procedure 600 with the recalibration of TMFF by measuring the CTMFF 602. It should be noted that recalibrated TMFF values are values that are on top of the original TMFF values obtained during disk drive certification. Subsequently, the magnitude and phase of the disk slip is calculated using the predefined $\psi_{1mil}$ 604. Then, the AC MR-offset compensation for selected target tracks on the disk is determined using the predefined $\eta_{1mil}$ and $\lambda_{1mil}$ 606; the target tracks may be pre-programmed into the firmware of the system controller to ensure even coverage of the entire disk surface. Thereafter, a polynomial $f$ based on the AC MR-offset compensation of the target tracks is determined 608. The polynomial function $f$ can be determined by curve fitting of a certain order. For example, a $4^{th}$ order polynomial has coefficients a0, a1, a2, a3, a4 such that $f(x) = a4^*x^4 + a3^*x^3 + a2^*x^2 + a1^*x + a0$, where x is the normalized track location. Finally, in the event of the HDD performing a write seek to a track, the determined polynomial $f$ is used to evaluate the AC MR-offset feed-forward compensation for the target track 610. More specifically, when the drive seeks to a new track x, the compensation value will be calculated based on the obtained polynomial equation $f(x)$ by substituting x into the equation.

Figure 7:
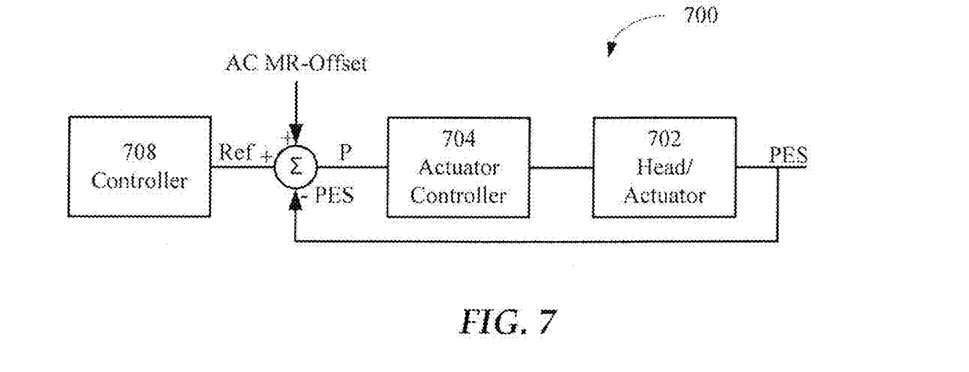
FIG. 7 is a simplified block diagram illustrating a closed loop servo control system of a disk utilizing AC MR-offset compensation.

The AC MR-offset compensation, which is appropriately applied during write operations, may be introduced into the servo control, closed loop, head positioning system 700 as illustrated in FIG. 7. As shown, placement of the head/actuator 702 for writing is achieved upon the actuator controller 704 responding to a position signal P to move the head/actuator 702. The position signal P represents the sum of the reference signal Ref provided by the controller 708, the position error signal PES feedback from the head/actuator 702 and the AC MR-offset feed forward compensation.

Figure 8:
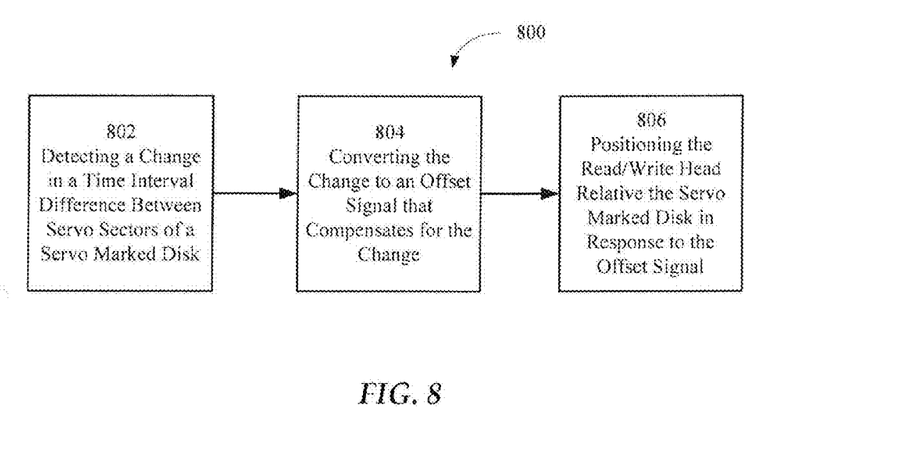
FIG. 8 is a simplified flowchart illustrating compensation of AC MR-offset in the field.

More generally, the AC MR-offset compensation method of the present disclosure may be described with reference to the flowchart of FIG. 8. Here, the method 800 comprises detecting a change in a time interval difference between servo sectors of a servo marked recording medium with the change in the time interval difference is representative of disk slip 802. Then, converting the change to an offset signal that compensates for the change 804. And, positioning the read/write head relative the servo marked recording medium in response to the offset signal 806.

Figure 9A:
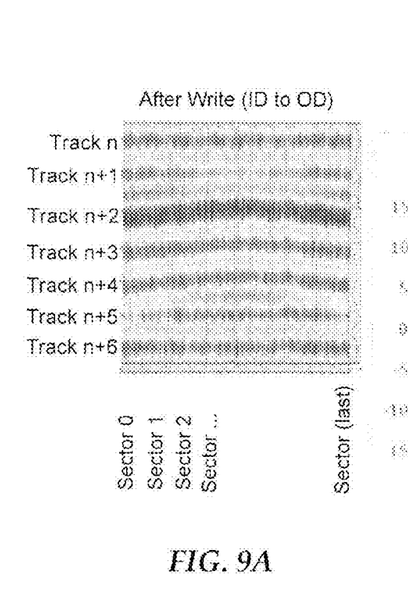
FIG. 9A provides an MRM plot with written data compensated with AC MR-offset compensation.

The AC MR-offset feed forward compensation system and method as described above was verified by using a drive with track density of 520 KTPI. After subjecting the drive to an 800 Gs@2 ms non-operational shock, the disk slip is 1.1 mil with an induced 13.2% TP AC MR-offset at the inner diameter as shown in the magnetic-readback-mapping (MRM) of FIG. 9A. Further illustrated in FIG. 9A is that track n+1 was partially erased after writing track n+4, n+3, and n+2 due to AC MR-offset. Tracks n+4, n+3, and n+2 look similar to a sine wave which is also due to the AC MR-offset.

Figure 9B:
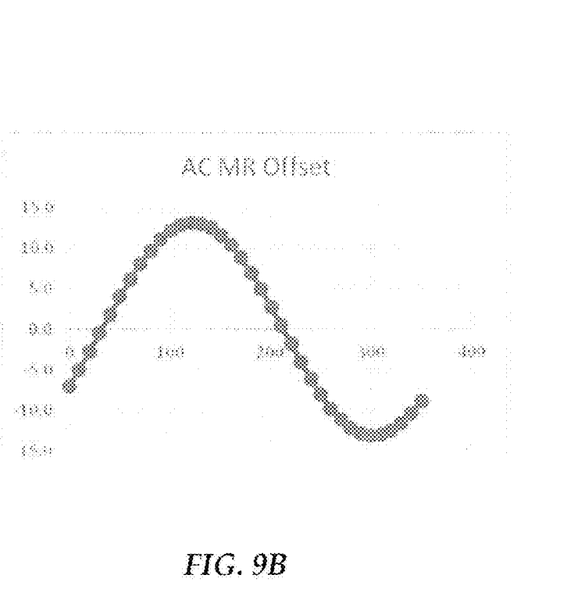
FIG. 9B illustrates calculated AC MR-offset compensation.
Figure 10:
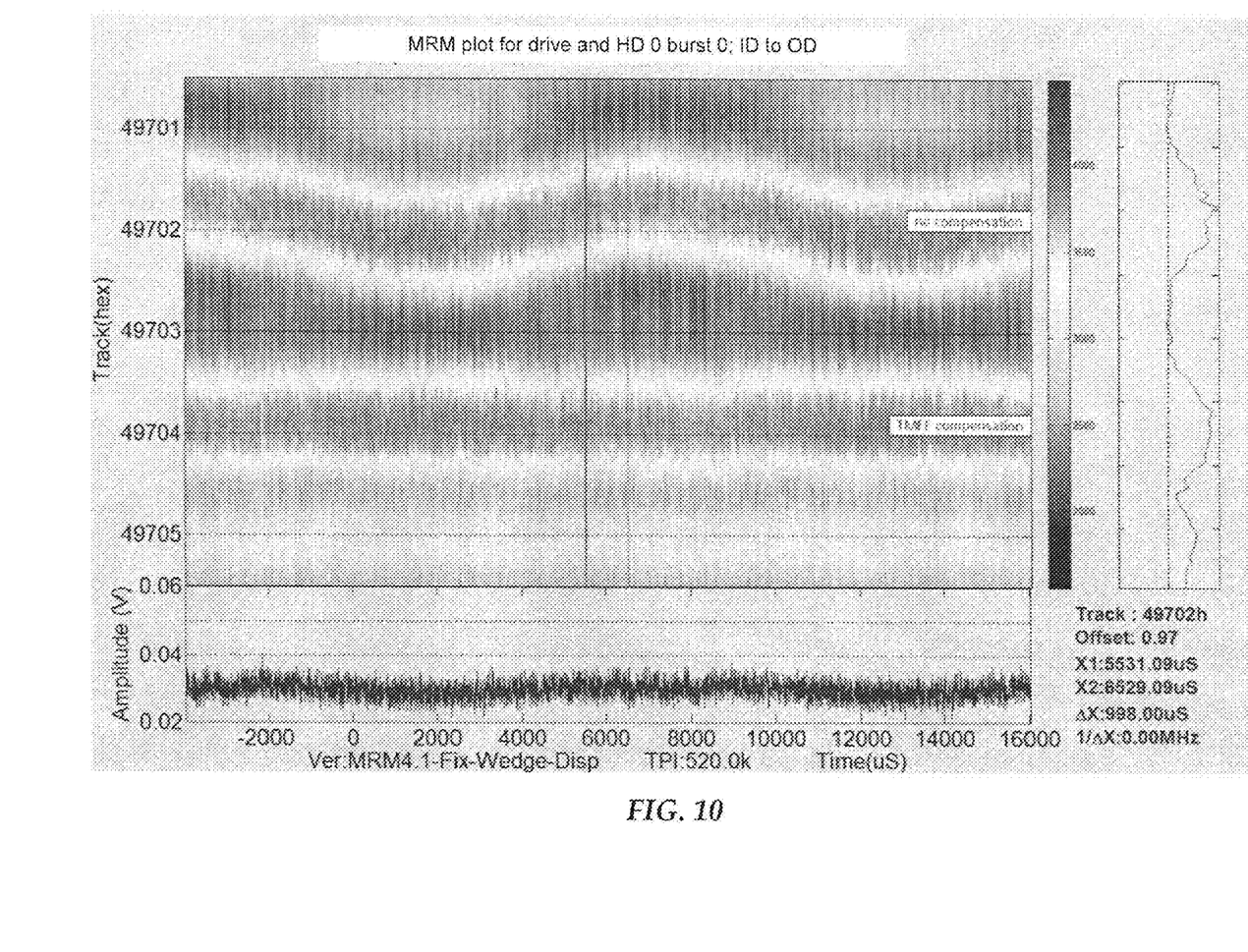
FIG. 10 illustrates various tracks of a servo marked disk after experiencing a non-operational shock that has been compensated through AC MR-offset compensation.

FIG. 9B illustrates that the calculated AC MR-offset compensation, as measured by CTMFF, can match the magnetic recording media almost exactly. As such, actual implementation of AC MR-offset compensation based on measured CTMFF is illustrated in FIG. 10. In this instance, the disk slip was 0.95 mil after a non-operational shock. Track 49702 was written without applying compensation while track 49704 is written with the AC MR-offset compensation, based on the TMFF recalibration value; the effect of compensation is notable as providing a substantially aligned track.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus, comprising:
   a controller configured to be coupled to a read/write head, the controller configured to perform:
   detecting a change in a time interval difference between servo sectors of a servo marked recording medium, the change in the time interval difference being representative of disk slip;
   recalibrating a time mark feed forward value (TMFF) to convert the change to an offset signal that compensates for the change; and
   positioning the read/write head relative the servo marked recording medium in response to the offset signal.

2. The apparatus of claim 1, wherein the detected change comprises a non-operational shock induced change.

3. The apparatus of claim 1, wherein recalibrating the TMFF value comprises measuring a cumulative time mark feed forward (CTMFF) value.

4. The apparatus of claim 1, wherein the offset signal comprises an AC MR-offset signal.

5. The apparatus of claim 1, wherein converting the change to an offset signal that compensates for the change is performed relative to a target track of the servo marked recording medium.

6. The apparatus of claim 5, wherein converting the change comprises determining a polynomial based on offset compensation of the target track.

7. A method, comprising
   detecting a change in a time interval difference between servo sectors of a servo marked recording medium, the change in the time interval difference being representative of disk slip, the disk slip causing a drift between a data track center relative to a motor rotation center;
   converting the change to an offset signal; and
   positioning the read/write head relative the servo marked recording medium in response to the offset signal to compensate for the drift.

8. The method of claim 7, wherein the detected change comprises a non-operational shock induced change.

9. The method of claim 8, wherein converting the change comprises recalibrating a time mark feed forward value (TMFF).

10. The method of claim 9, wherein recalibrating the time mark feed forward (TMFF) value comprises measuring a cumulative time mark feed forward (CTMFF) value.

11. The method of claim 7, wherein the offset signal comprises an AC MR-offset signal.

12. The method of claim 7, wherein converting the change to an offset signal that compensates for the change is performed relative to a target track of the servo marked recording medium.

13. The method of claim 12, wherein converting the change comprises determining a polynomial based on offset compensation of the target track.

14. An apparatus, comprising:
   a controller configured to be coupled to a read/write head, the controller configured to perform:
   detecting a non-operational shock induced change in time interval difference from the pre-determined time interval difference between servo sectors of a servo marked recording medium, the change in the time interval difference being representative of disk slip, the disk slip causing a drift between a data track center relative to a motor rotation center;
   converting the change to an offset signal; and
   positioning the read/write head relative the servo marked recording medium in response to the offset signal to compensate for the drift.

15. The apparatus of claim 14, wherein converting the change comprises recalibrating a time mark feed forward value (TMFF).

16. The apparatus of claim 15, wherein recalibrating the time mark feed forward (TMFF) value comprises measuring a cumulative time mark feed forward (CTMFF) value.

17. The apparatus of claim 14, wherein the offset signal comprises an AC MR-offset signal.

18. The apparatus of claim 14, wherein converting the change to an offset signal that compensates for the change is performed relative to a target track of the servo marked recording medium.

19. The apparatus of claim 18, wherein converting the change comprises determining a polynomial based on offset compensation of the target track.

* * * * *